United States Patent [19]

Lemire et al.

[11] Patent Number: 5,682,538
[45] Date of Patent: Oct. 28, 1997

[54] AUTOMATIC ADAPTIVE COMPUTER SCREEN GENERATION

[75] Inventors: John P. Lemire, Redmond; Mark A. Mortensen, Mercer Island; Patrick D. Jenny, Redmond; Todd Allan Barnes, Snohomish, all of Wash.

[73] Assignee: Wall Data Incorporated, Seattle, Wash.

[21] Appl. No.: 289,911

[22] Filed: Aug. 12, 1994

[51] Int. Cl.$^6$ .................................................. G06T 1/00
[52] U.S. Cl. ........................................................ 395/768
[58] Field of Search ........................... 395/148, 149, 395/155–161, 600, 201–204, 228–229, 230–234, 606–607, 615, 766–771; 364/401, 403, 408, 419.07, 419.1, 419.13, 419.14, 419.15, 419.16, 419.17; 382/217–219

[56] References Cited

U.S. PATENT DOCUMENTS

| | | | |
|---|---|---|---|
| 4,212,077 | 7/1980 | Vittorelli | 364/900 |
| 4,760,528 | 7/1988 | Levin | 364/419.15 |
| 4,777,596 | 10/1988 | Shaffer et al. | 364/419.15 |
| 4,939,689 | 7/1990 | Davis et al. | 395/600 |
| 4,969,097 | 11/1990 | Levin | 364/419.15 |
| 5,107,419 | 4/1992 | MacPhail | 395/600 |
| 5,109,509 | 4/1992 | Katayama et al. | 395/600 |
| 5,222,211 | 6/1993 | Mueller et al. | 395/161 |
| 5,224,038 | 6/1993 | Bespalko | 364/419.1 |
| 5,263,174 | 11/1993 | Layman | 395/800 |
| 5,299,305 | 3/1994 | Oomae et al. | 395/149 |
| 5,367,619 | 11/1994 | Dipaolo et al. | 395/149 |

FOREIGN PATENT DOCUMENTS 60-252942  12/1985  Japan.

OTHER PUBLICATIONS

Frantz, Seta, One Minute Reference (Quicken 6), Alpha Books, pp. 162–163 1993.

Primary Examiner—Joseph H. Feild
Attorney, Agent, or Firm—Christensen O'Connor Johnson & Kindness PLLC

[57] ABSTRACT

A method and apparatus for the automatic completion of a computer generated screen including a plurality of fields. As the user completes each field in the screen with an alphanumeric string, the alphanumeric string is associated with an identification number. The alphanumeric string entries in the fields of the screen can be represented as a sequence of identification strings. As each screen is completed by the user, the present invention generates a sequence of identification strings representative of the screen. The rows are stored in memory and are used to automatically complete later screens at the user's command. When a user wishes to automatically complete the screen, the fields of the current screen that contain alphanumeric strings are analyzed. Once all of the fields have been analyzed and a sequence of identification numbers formed, the sequence of identification numbers for the current screen is compared to the plurality of sequences of identification numbers for prior screens.

11 Claims, 9 Drawing Sheets

Fig. 2.

AUTOMATIC ADAPTIVE COMPUTER SCREEN GENERATION

FIELD OF THE INVENTION

The present invention relates to the automatic completion of computer screens and, more particularly, a method and apparatus for automatically completing a computer screen based upon the past history of computer screens input by a user.

BACKGROUND OF THE INVENTION

Many personal computer systems are used for the repetitive entry of information onto a computer-generated screen. For example, the entry of large numbers of sales invoices requires the manual entry of information with respect to each sales invoice in regards to the buyer, quantity, address, price, and other identifying information. In such a situation, a user must manually enter in all of the information for a particular sales invoice. The sales invoice as generated on the computer screen may constitute 20 or 30 separate fields. This constant and repetitive input of sales invoice information can be undesirable from a time required standpoint, as well as from an operator fatigue standpoint. By minimizing the repetitive nature of the task of inputting information, mistakes in the input data can be significantly reduced. In addition, operator efficiency can be increased. Heretofore, there has been no effective means for facilitating the input of repetitive data. Instead, each quantum of data had to be input manually. The present invention solves these and other deficiencies in the prior art by presenting an automatic adaptive screen completion method that analyzes the prior history of screen inputs and, based upon that input, completes the screen, or portions of the screen automatically.

SUMMARY OF THE INVENTION

The present invention is directed towards the automatic completion of a computer generated screen based upon past user completions of the screen. The screen is comprised of a plurality of fields. As the user completes each field in the screen with an alphanumeric string, the alphanumeric string is associated with a identification number. If the same alphanumeric string is input in a field, the same identification number is associated with the string. The alphanumeric string entries in all the fields of the screen can be represented as a sequence of identification strings. As each screen is completed by the user, the present invention generates a sequence of identification strings (also referred to as a row) representative of the screen. These rows are stored in memory and are used to automatically complete later screens at the user's command.

In operation, a user completes one or more of the plurality of fields in the screen. The user has the option of invoking the automatic completion of the screen. When the screen complete command is invoked, the fields of the current screen that contain alphanumeric strings are analyzed. In particular, each alphanumeric string is examined to determine if an associated identification number exists for that particular alphanumeric string. If so, then the identification number is associated with that string. For alphanumeric strings that do not have an associated identification number, a new identification number is generated. Once all of the fields have been analyzed and a sequence of identification numbers formed, the sequence of identification numbers for the current screen is compared to the plurality of sequences of identification numbers for prior screens. In one preferred embodiment, the sequence of identification numbers for prior screens that has the most matches with the current screen sequence of identification numbers is identified. Next, the alphanumeric strings that are associated with the sequence of identification numbers are returned to the user. The appropriate alphanumeric strings are returned to the user and input into each appropriate field. If the field already includes a string, the previous string will be overwritten with the returned alphanumeric string.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 is a representation of a data entry screen having a plurality of fields;

DETAILED DESCRIPTION OF THE PREFERRED EMBODIMENT

Figure 1:
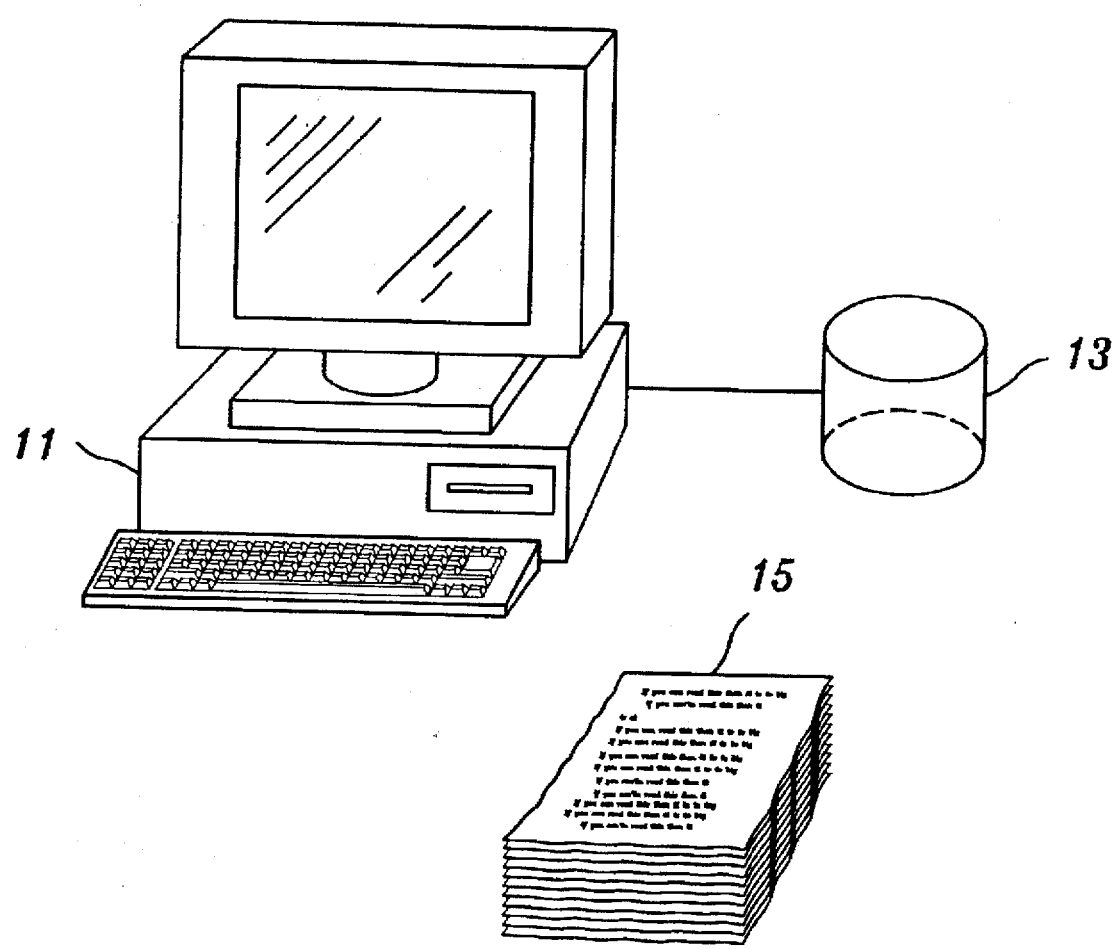
FIG. 1 is a diagram of a data entry terminal and associated storage.

FIG. 1 illustrates a system that may employ the present invention. The system includes a personal computer 11, a database 13, and a plurality of input forms 15. The present invention is intended for use by personal computer users that are tasked to enter into database 13 a multitude of similar or repetitive forms. As an example, the forms may be sales invoices containing information that is to be entered into the database 13. Although not shown in FIG. 1, it can be appreciated that the personal computer 11 includes a central processing unit, input/output ports, a video screen, keyboard, and various dynamic and static memory devices. Each of these components act in consort to implement the method of the present invention and form, in part, the apparatus of the present invention.

Figure 2:
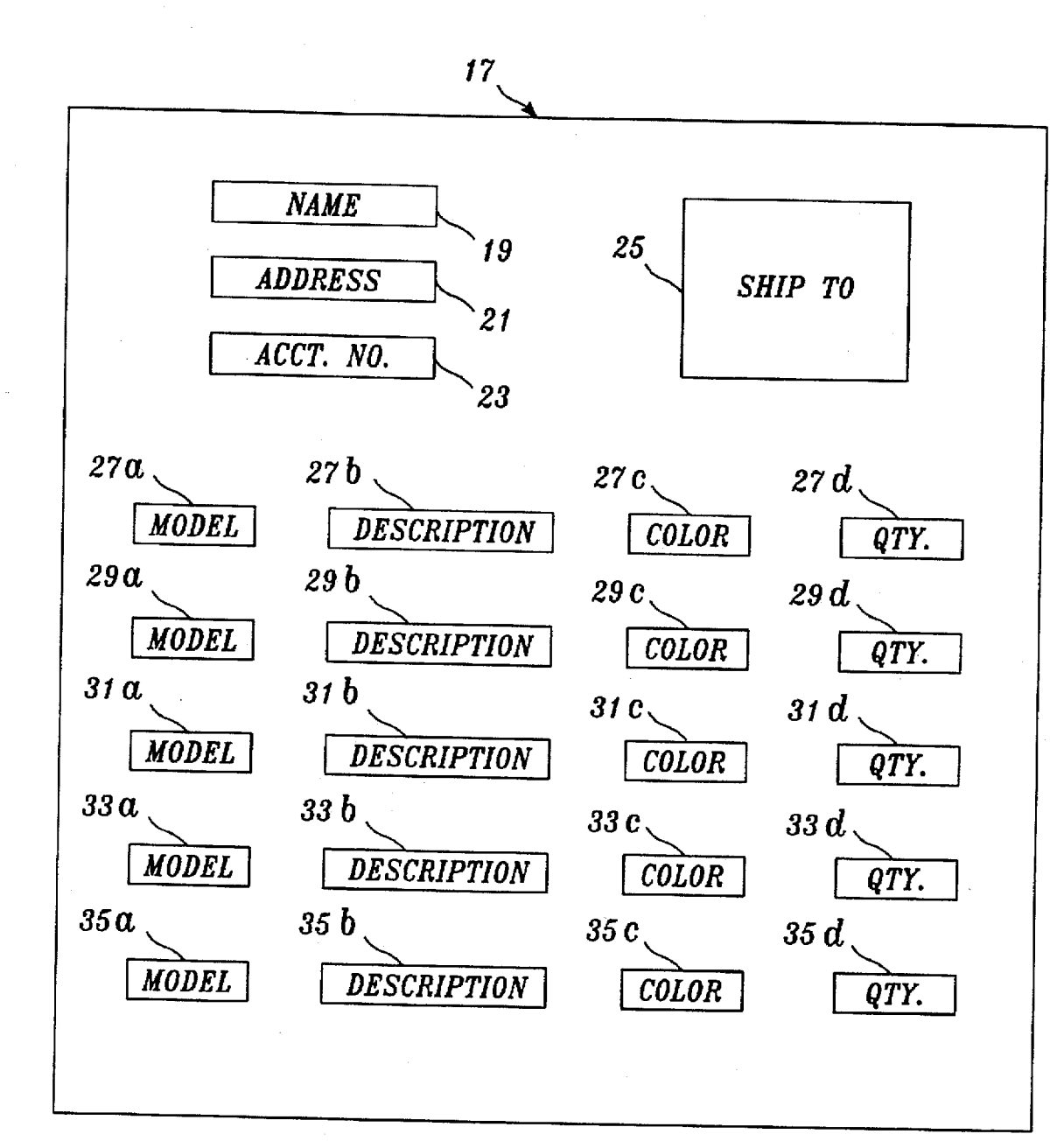

Turning to FIG. 2, a typical screen generated by the personal computer 11 for reception and input of the invoices 15 is shown. The screen 17 includes a plurality of fields. For example, there is a "name" field 19, an "address" field 21, an "account number" field 23, and a "ship to" field 25. In addition, the screen includes a plurality of rows 27, 29, 31, 33, and 35. Each of the rows include four different fields designated a–d which correspond respectively to, for example, the model number of the product ordered, a written description of the product, the color of the product, and the quantity ordered. In entering a sales invoice into the personal computer 11, typically each of the fields 19–25 and at least one of rows 27–35 must be completed in order for the sales invoice to be processed.

The present invention provides an improved method of entering into the personal computer 11 a large quantity of sales invoices that may or may not have a indeterminate degree of similarity as amongst themselves. In particular, the present invention provides for the automatic completion of a field in the screen based upon preliminary manual keystroke input by the user. In addition, the present invention also provides for automatic completion of the entire screen based upon the completion of none, one, or any number of plurality of fields within the screen.

Figure 3:
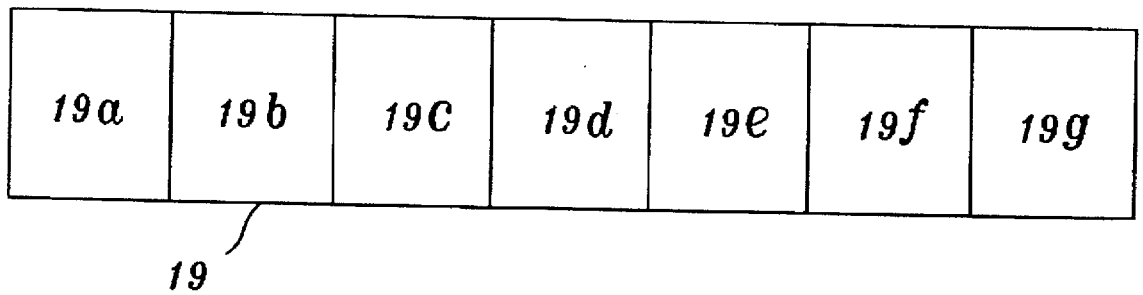
FIG. 3 is a representation of a field in the data entry screen, the field having a plurality of characters.

Addressing the first aspect of the present invention, that of completing a field based upon preliminary manual input of keystrokes, reference is made to FIG. 3 which shows a field in greater detail. As an example, the name field 19 has been expanded and shows seven different character subfields 19a–19g. It can be appreciated that although only seven character subfields are shown in FIG. 3 for the name field 19, the name field 19 can contain additional character subfields in order to accommodate a maximum character field length. During operation, a user enters an alphanumeric string in the field. In this case, the user would enter a name from one of the sales invoices 15 by manually typing the name of the customer a single character at a time.

Figure 4:
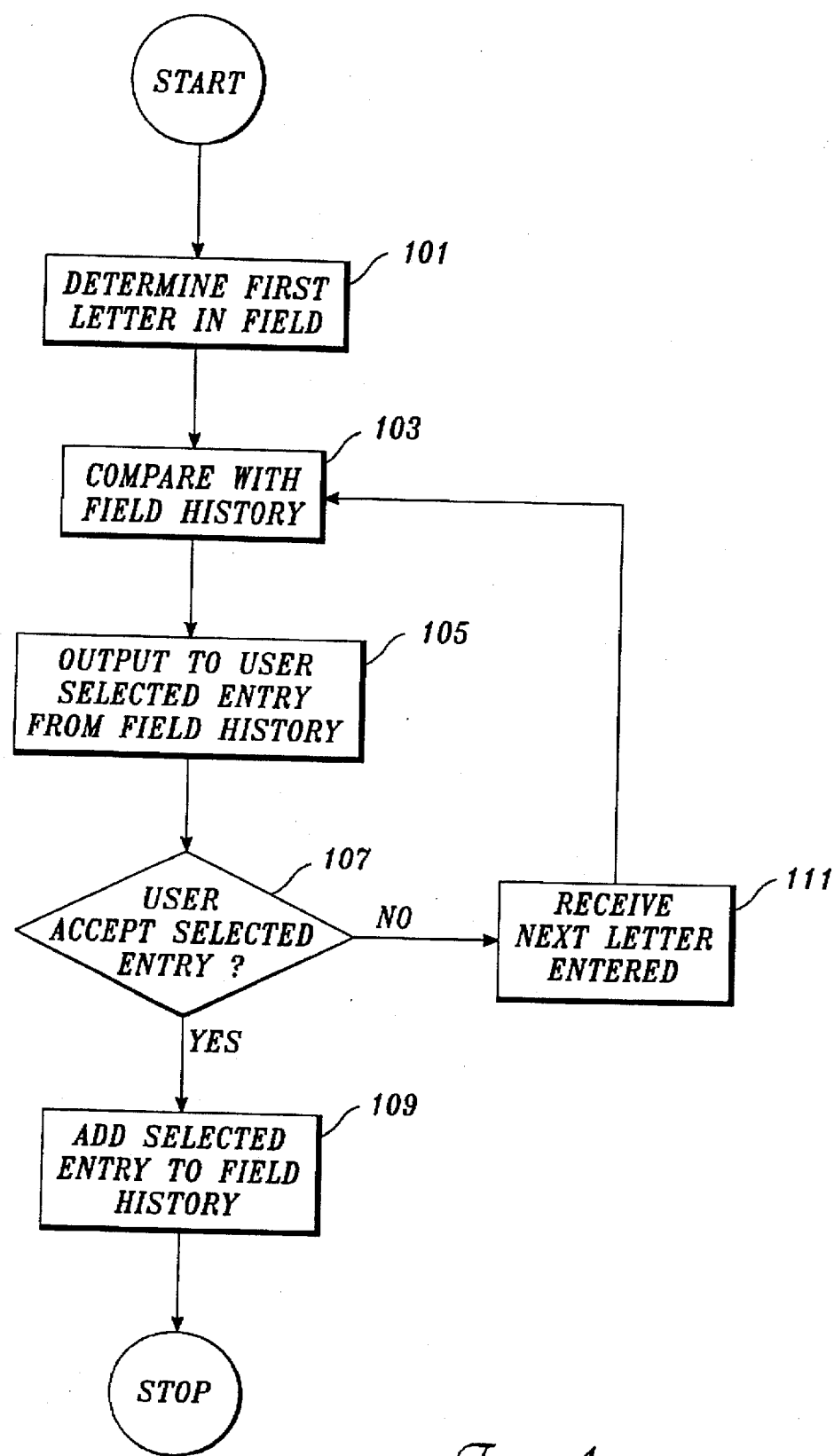
FIG. 4 is a flow diagram illustrating the method of automatically completing a field.

When the first character is input into character subfield 19a, the present invention automatically activates and in accordance with FIG. 4 begins attempting to match the input into name field 19 with previously entered alphanumeric strings into name field 19. For example, if the first letter entered into character subfield 19a is an "S," turning now to FIG. 4, at a box 101, the first letter is identified as an "S." Next, at a box 103, the first letter entered "S" is compared with the first letter of any previously entered names in that particular name field 19.

The previously entered names are stored from manual entries made by the user prior to the current screen. Thus, it can be appreciated that as each alphanumeric string is entered into the field, it is stored in memory, either resident on personal computer 11 or at database 13. As the user enters in additional sales invoices, the number of different alphanumeric strings entered in a particular field would undoubtedly increase. At a predetermined threshold, definable by the user and typically determined by memory capacity and processor search speed, additional new alphanumeric strings above the threshold are not stored as additional entries. Instead, once the threshold has been reached, the least frequently used string is discarded and the new alphanumeric string is saved. In one preferred embodiment, the predetermined threshold is set at 256 different alphanumeric strings.

In this manner, a prior history of data entry can be built and used to automatically complete a field, or as seen in greater detail below, complete an entire screen. In addition, if a particular alphanumeric string such as "SEATTLE" is entered multiple times, a record is kept as to the frequency of entry. In one actual preferred embodiment, the alphanumeric string itself is stored in memory. Each alphanumeric string that is input is associated with and converted to its unique numeric identification number. If the alphanumeric string has not been encountered previously, a new numeric identification number is assigned. This identification number is stored in memory and an association method is utilized to convert the identification number to an alphanumeric string. It can be appreciated that the number of identification numbers can be quite large insofar as there is a unique identification number for each unique alphanumeric string.

Next, once the first letter in subfield 19a is determined, at box 103, the present invention in one embodiment operates to match the first letter in subfield 19a to the most recent name entered into field 19 that also had the character "S" in subfield 19a. Next, at box 105, the previous entry in name field 19 from the field history is output onto the screen for the user to examine. At box 107, the user can either accept the selected entry or reject the selected entry. If the selected entry presented by the personal computer 11 is accepted by the user, then at box 109, the selected entry is added to the field history as being the most recent entry in the name field 19. However, if at box 107, the user does not accept the selected entry, then at box 111, the user enters in the next character in the stream at character subfield 19b.

Control of the process returns to box 103 where a comparison is made between the first two letters entered by the user in character subfield 19a–19b and with the first two letters of all of the previous entries in the field history and in particular the first two characters of those entries. Next, at box 105, the most frequent entry that corresponds to the first two letters input by the user is then output to the user. Again, at box 107, the user can either accept the suggestion of the present invention or reject it. The process of boxes 101–111 is repeated until either the user accepts a suggestion from the person computer 11 or has completed manually entering in the information in name field 19.

In the preferred embodiment, the analysis and determination of which previous entry to return to the user after matching of characters is done on a most frequent basis. In other words, in the example above, if the first character input is an "S" and previous entries for "SEATTLE," "SAN DIEGO," and "SAN FRANCISCO" exist, then the most frequently entered previous entry would be returned. Thus, if "SEATTLE" had been entered 15 times, "SAN DIEGO" had been entered 10 times, and "SAN FRANCISCO" had been entered 12 times, then the alphanumeric string "SEATTLE" would be returned to the user as a suggestion. In other embodiments, the return of previous entries can be based on alphabetical order of the next character. In that case, the alphanumeric string "SAN DIEGO" would be returned in response to the entry of an "S." In still other embodiments, the recency of a previous entry is used. For example, in the example above, if the first character input is an "S" and previous entries for "SEATTLE," "SAN DIEGO," and "SAN FRANCISCO" exist, then the most recently entered previous entry would be returned. Moreover, if in the preferred embodiment of relying upon frequency of entry, if there are two or more entries with the same frequency of entries, then the most recent of the two or more entries is returned. Thus, the recency of a previous entry is used as a "tiebreaker" if the frequency of two or more entries is equivalent.

In addition, in the preferred embodiment, an additional check is made as the user enters in each additional character. In particular, as each character is input by the user, the database is examined for an exact match to the currently entered string. If an exact match is found, and this exact match string has not previously been output to the user, the exact match string is returned to the user. Otherwise, the most frequent not previously displayed entry will be returned to the user.

Furthermore, it can be appreciated that the initial entries in a field by the user may not result in any appropriate matches. This results from the lack of information in the database 13 with regard to previous entries for that field. In that case, the present invention does not provide a selected entry from the field entry, but rather indicates that there are no matches by not presenting a selected entry. In addition, the number of entries in the field history is variable and may be predetermined and/or configured by the user or a system administrator. The process described for name field 19 is also implemented with the remaining fields in FIG. 2. In this manner, considerable advantage can be gained by having the personal computer 11 implement suggestions to the user. Thus, where sales invoices have a large amount of commonality between invoices, much repetitive data entry can be avoided.

In addition, another aspect of the present invention provides for the automatic completion of the entire current screen based upon the fields that have already been completed by the user and the previously entered screens. In general terms, the method and apparatus attempts to match the partial screen entry with that contained by previously entered screens.

Figure 3A:
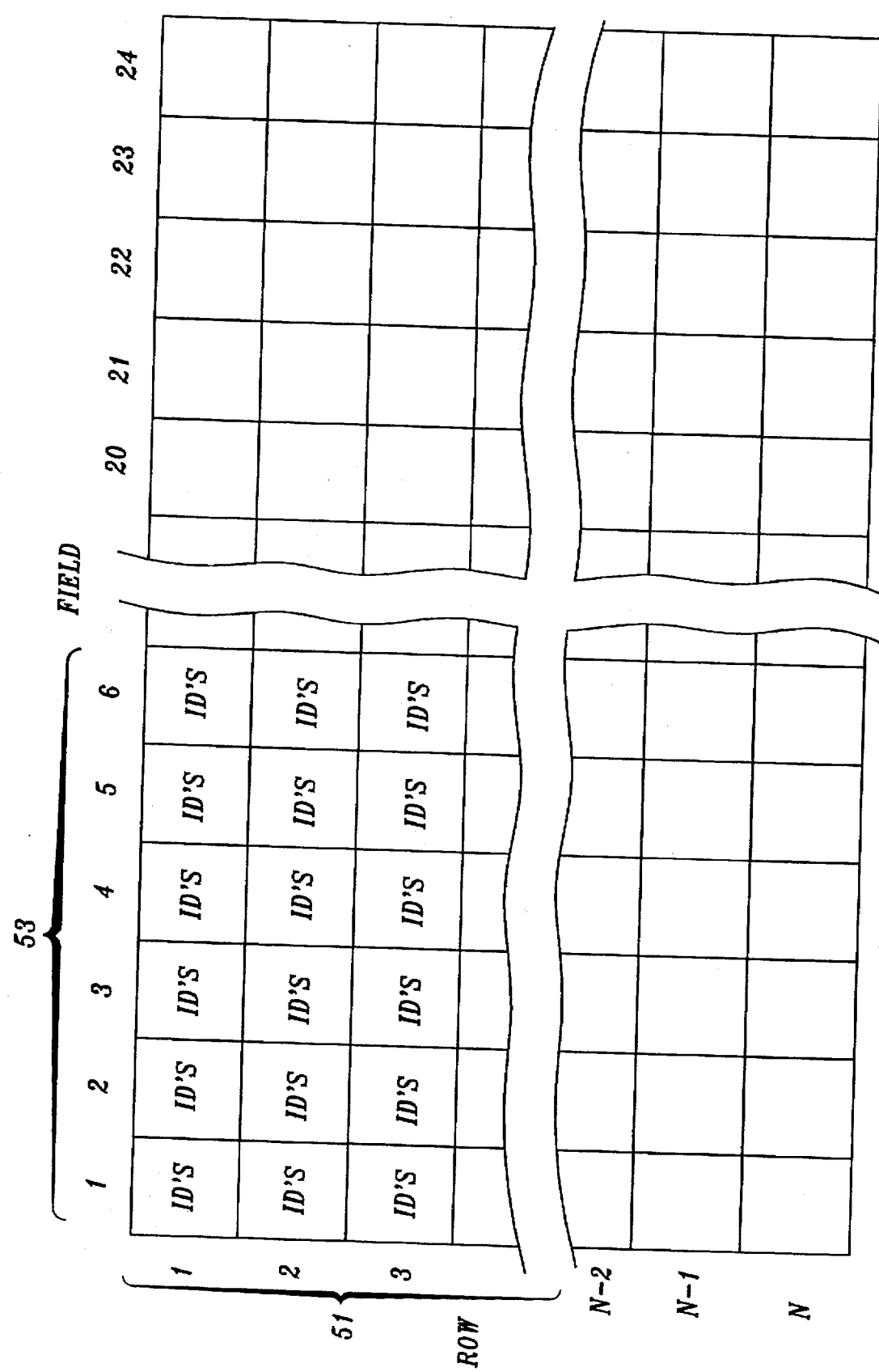
FIG. 3A is a representation in matrix format of the history of screens previously entered.

In order to maintain a record of previously entered screens, it is helpful to use as an analogy the schematic diagram shown in FIG. 3A which shows a matrix of identification numbers. Each row 51 of the matrix corresponds to a representation of a previously entered screen and is a sequence of identification numbers. Each row includes a plurality of entries each corresponding to a field within the screen. Thus, in FIG. 3A, each row includes 24 columns of entries insofar as FIG. 2 show a screen with 24 fields. Each prior screen is represented by a sequence of identification numbers. As noted above, the identification numbers are associated with a particular alphanumeric string. The matrix in FIG. 3A shows N number of rows or previously entered screens, each screen including 24 fields.

Figure 5:
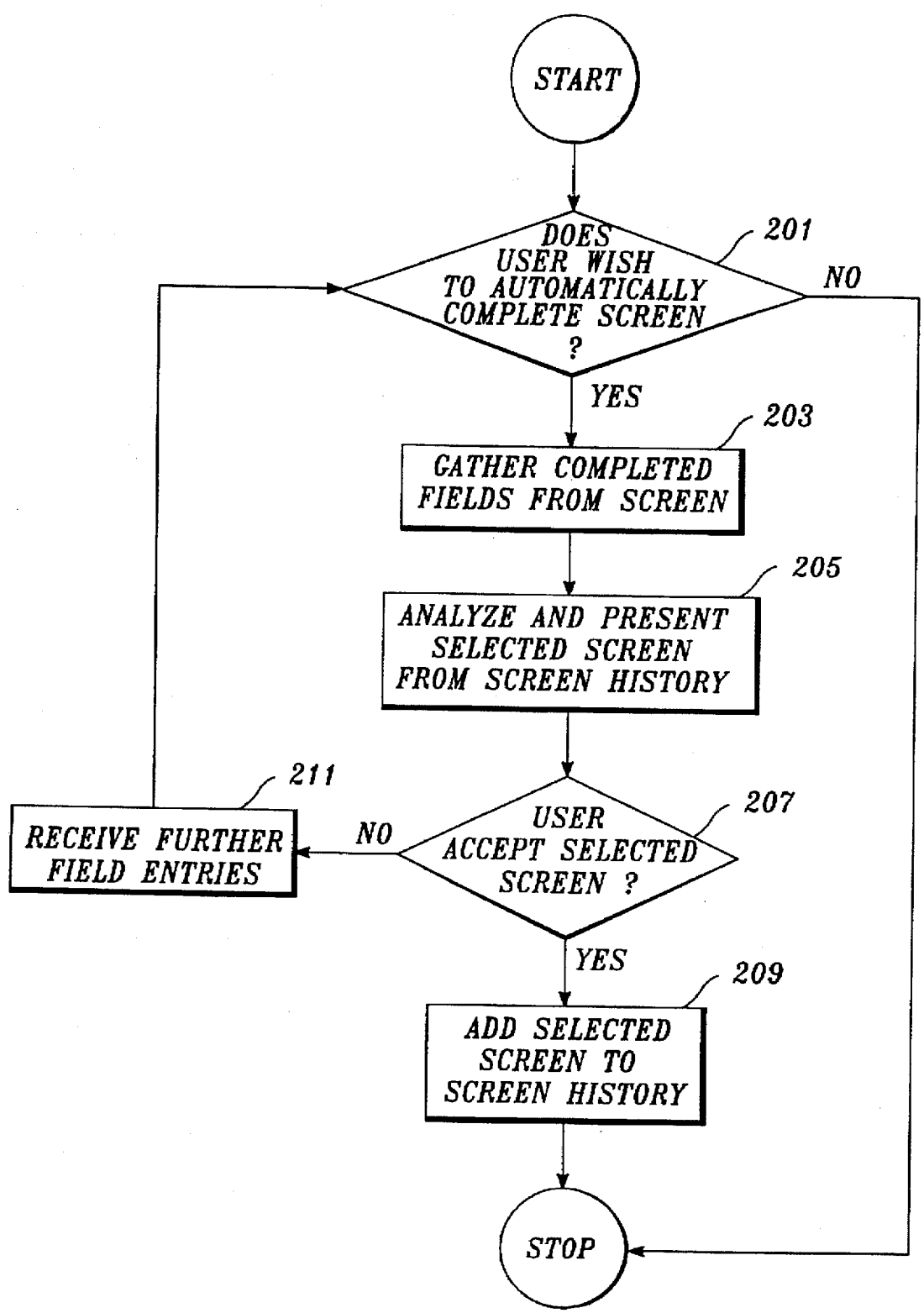
FIG. 5 is a flow diagram illustrating the method of automatically completing a screen.

Turning to FIG. 5, a flow diagram illustrates the method of completing a screen based upon data input into the fields of the screen. In the preferred embodiment, the user can initiate a screen complete even when none of the individual fields contain strings. In such a case, the most frequently occurring perviously encountered screen is provided to the user. In the more typical case, the user will not initiate the screen complete command until the user has input entries into one or more of the fields. For example, at box 201, a decision is made as to whether or not the user wishes to invoke a screen complete command. If the user does not, then the screen complete command is not carded out and the user can continue with a manual completion of each of the fields on the screen. However, if the user does wish to complete the screen, then at box 203, the entries that have been entered by the user in those fields already containing alphanumeric strings are gathered. Next, at box 205, the alphanumeric strings are analyzed and the most appropriate match from the screen histories already entered is presented to the user. The analysis is done in accordance with the method shown in FIGS. 6A–6C.

Figure 6A:
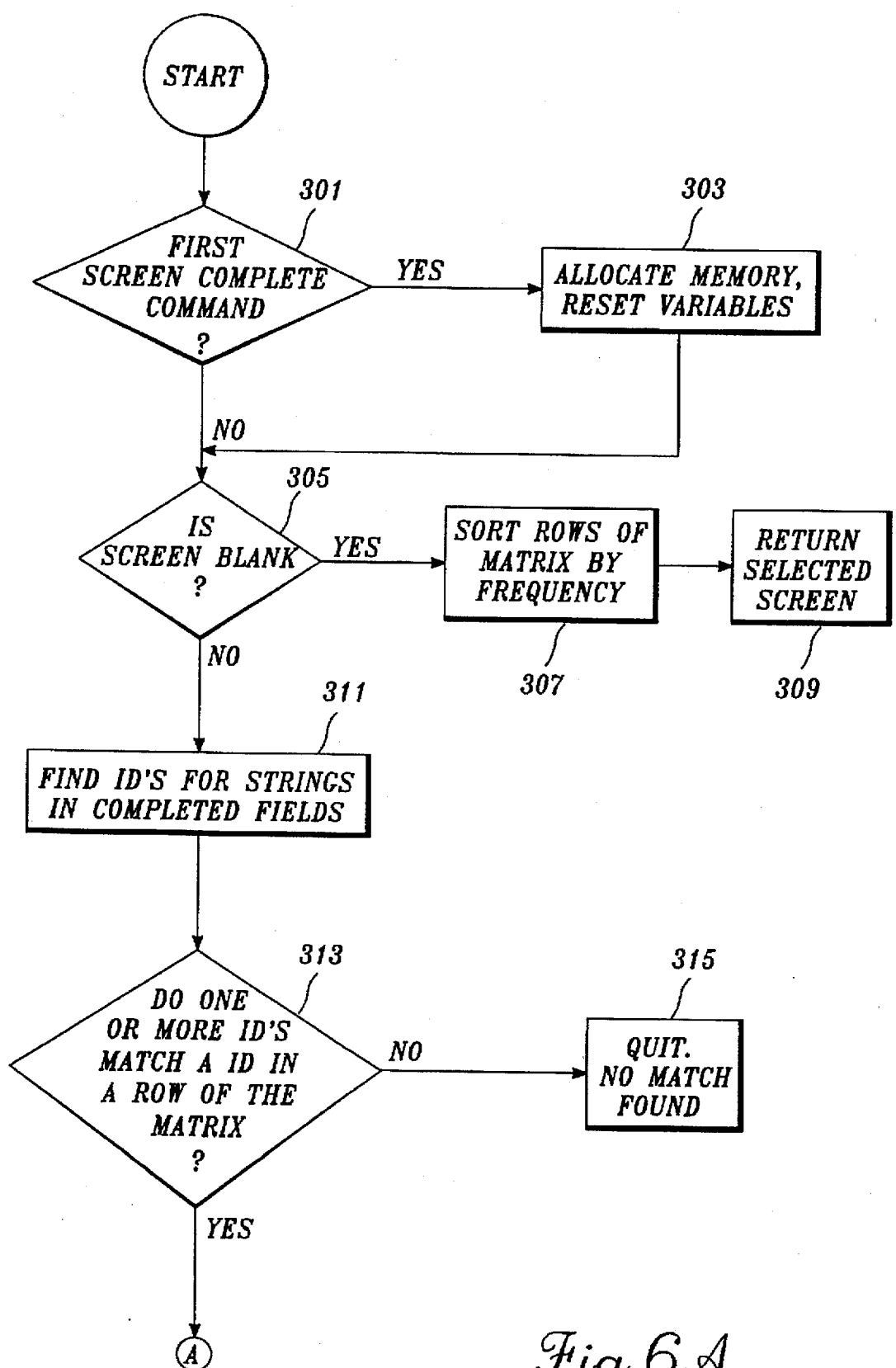
FIGS. 6A–6C are flow diagrams that illustrate in greater detail the automatic completing of a screen.

First, at a box 301 shown in FIG. 6A, a determination is made as to whether the screen complete command is the first such screen complete command for this particular screen. If it is, then at box 303, memory space is allocated and all variables are reset. In particular, two separate memory arrays are allocated and reset. The first array stores and maintains the identification numbers for all of the input alphanumeric strings in the current screen. The first array also maintains a record as to which previously entered screens have already been displayed. This information is important in allowing the user to cycle through a plurality of previously entered screens that each fit a selection criteria. For example, if a user invokes the screen complete in three consecutive instances, the information in the first array prevents the same previously entered screen from being presented to the user. Instead, by using the information stored in the first array, each of the previously entered screens that meet the selection criteria are displayed sequentially.

The second array contains information that identifies the previous screens that meet the selection criteria. For example, if five "rows" out of two-hundred of the previous screen matrix satisfy the selection criteria, the second array maintains the identity and location of these five previously entered screens. It is from the second array that the next previously entered screen is selected in which to present to the user in response to a screen complete command.

The first and second arrays are allocated and generated upon a first screen complete command from the user for a particular screen. If the screen complete command is a second or later such screen complete command, then both arrays will remain for the duration of the user's manipulation of that particular screen.

If the screen complete command is not the first for this screen, then control returns to box 305. Control also returns to box 305 following allocation of memory and resetting of the variables (the arrays). At box 305, a determination is made as to whether or not the screen is blank, i.e., none of the fields in the screen contain any characters. If the screen is blank, then at box 307, the rows of the matrix are sorted by frequency. In particular, as each previously entered screen is converted into a row of identification numbers, the present invention maintains a record as to the number of times the precise screen (as a combination of fields) has been previously entered by the user. Thus, if the user enters the exact same screen ten times, those ten previously entered screens would be represented in the matrix by a single row with a frequency of ten.

Similarly, for other rows, a frequency value is placed on them. Thus, when the sorting begins, the largest frequency rows are placed in the forefront and the smallest frequency rows are placed in the background. In the preferred embodiment, whereby the screen returned to the user upon a screen complete command is dictated by frequency, the row with the highest frequency is displayed to the user. Following this sorting operation, at box 309, the rows of the matrix that occur with highest frequency are returned to the user. The above situation where the screen is blank and the user requests screen complete may occur, for example, when the user wishes to recall the most commonly entered information and work from that screen.

If, however, at box 305, the screen is not blank, all of the completed fields of the screen are analyzed. The analysis provides a sequence of identification numbers, one identification number associated with one field. Thus, referring to FIG. 2, the sequence would consist of 24 identification numbers, one for each field. Each of the strings in each of the fields is analyzed separately and is assigned an identification number. If the string in a particular field matches a string input previously, then the identification number of that string is provided. If the string is a new string, then a new identification number is associated with that string. For example, if the string in the name field 19 is "ACME" and if "ACME" had already been previously entered and had associated therewith an identification number (111111), then the string in field 19 would be converted into the identification number 111111. Following the analysis, the screen in FIG. 2 would consist of 24 identification numbers, some of which may be blank because not all of the blanks are completed.

Next, at box 313, a determination is made as to whether or not one or more of the identification numbers match with the identification numbers in previously entered screens. In other words, once the sequence of identification numbers for the screen to be completed is determined, then this sequence is examined against all N rows of previous screens as shown in FIG. 3A. It should be stated that not each and every field of a screen need be completed. Therefore, not each and every sequence position will have an identification number. When the sequence of ID's for the screen to be completed is compared with the sequence of ID's for the previous N screens, a determination is made as to whether there are any matches in the sequence of ID's. If there are no matches, then at box 315, the analysis quits and a blank screen is returned to the user.

Figure 6B:
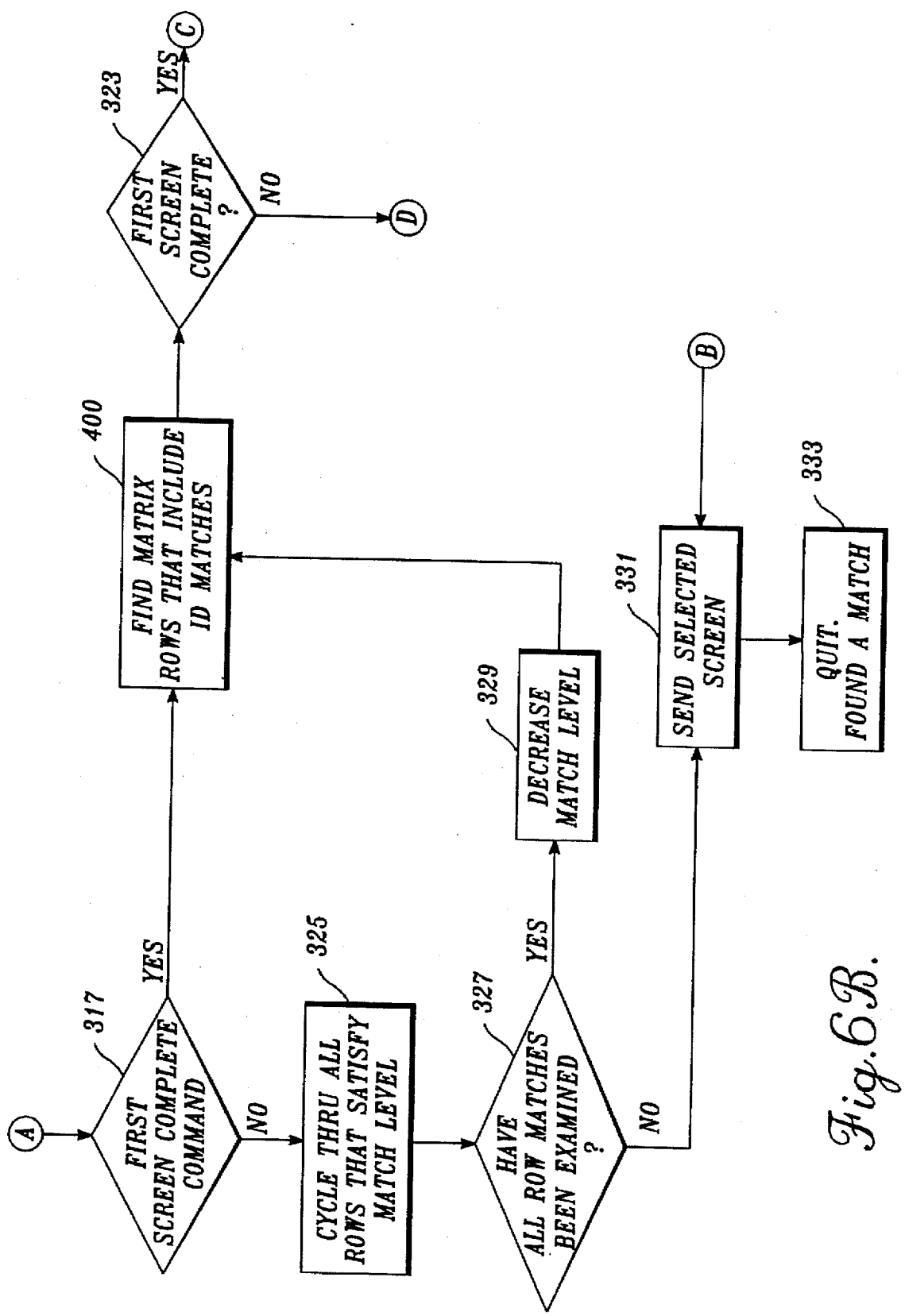

If, however, there are matches with one or more of the previous rows, then at box 317 as shown in FIG. 6B, it is determined this is the first screen complete command for this screen. If it is, then at box 400, all matrix rows that include matches from the identification numbers are identified. Next, at box 323, the determination is once again made as to whether this is the first screen complete command. If yes, then at box 401 shown in FIG. 6C, a match level is set to the highest number of matches found for any single row (or previously entered screen). For example, each row representing a previously entered screen will have a certain number of matching identification numbers (corresponding to one field). Clearly, some rows will have more identification number matches with the current screen than other rows. Thus, at box 401, the row with the highest number of identification number matches is chosen and the number of matches is chosen as the match level. The higher the number of matches between identification numbers, the more similar the current screen to a previously entered screen. The match level is the number of matches between the sequence of the screen to be completed and any one of the previous rows of identification numbers.

Next, after the match level has been set, or if at box 323 it is determined that this is not the first screen complete, box 403 is executed. At box 403, all rows that have the same number of matches as the match level are gathered. Next, at box 405, if there are any rows that satisfy the match level, then at box 331, the first of the selected screens is presented to the user. If at box 405, no rows are identified that satisfy the match level, then at box 407, the match level is decreased incrementally, in the preferred embodiment, by one. Next, at box 409, a determination is made as to whether the match level is positive. If not, then at box 411, it is apparent that none of the rows have any identification numbers that match that of the current screen. Therefore, at box 411, as a default condition, the most recent previously entered screen is selected. At box 413, if a most recent row is selected, then at box 331, the selected screen is presented to the user. If however, there is no most recent row selected, then at box 415 no screen is presented to the user. If at box 409, the match level is still positive, then control returns to box 403.

Returning back to box 317, if the screen complete command is not the first such command, then at box 325, all previous rows that satisfy the match level are cycled through to the user. At box 327, once all of the row matches have been examined by the user, and the user does not accept any of them, then the match level is decreased and the procedure of box 400 is followed. If however the user accepts a row match, then the selected screen is accepted at box 331 and the analysis ends at box 333.

Figure 6C:
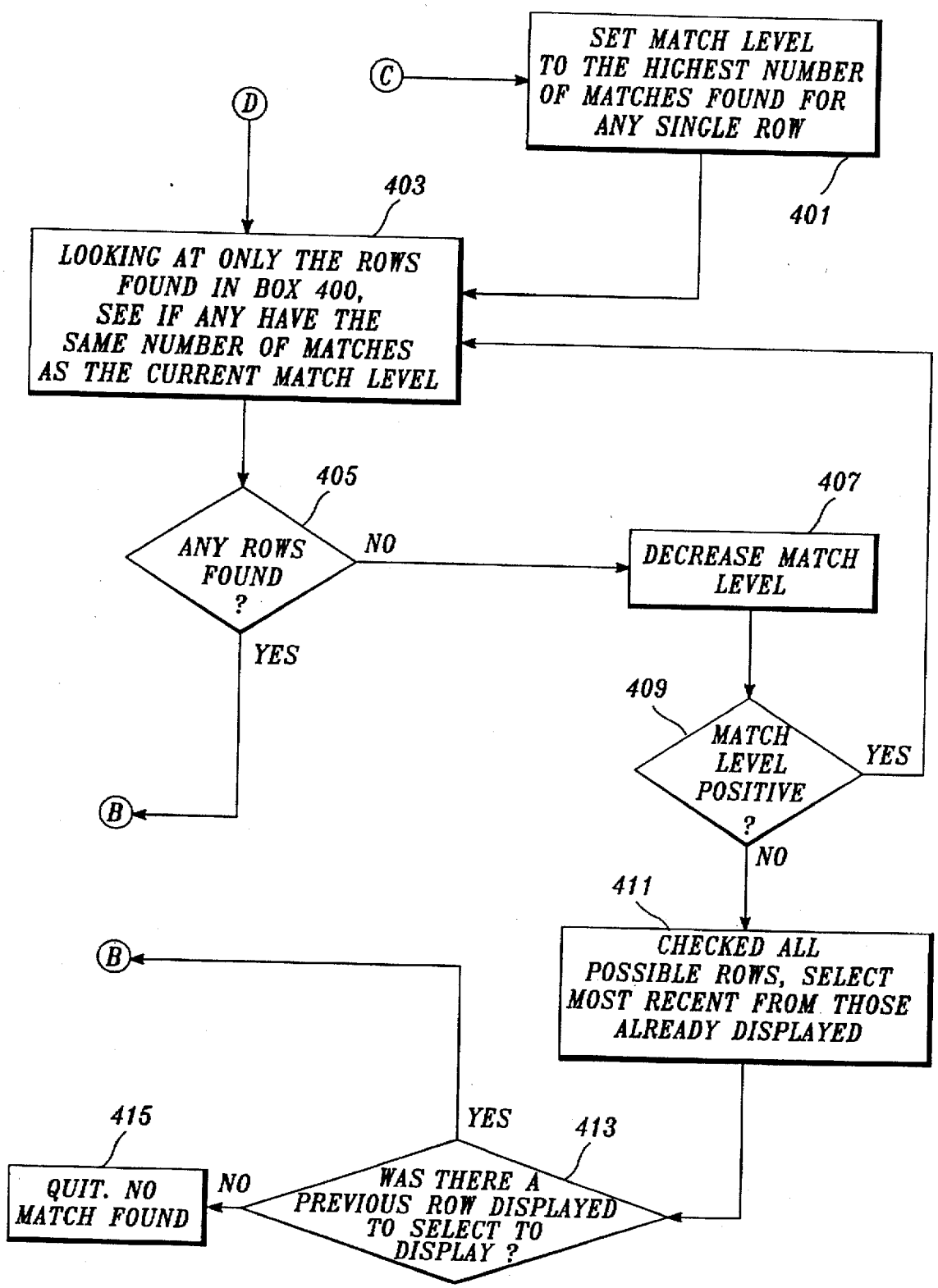

Once the analysis of FIGS. 6A–6C is complete, at box 207 shown in FIG. 5, the user can either accept the selected screen or reject the selected screen. If the user accepts the screen, then at box 209, the selected screen as modified by the user is stored in the screen history as a row of identification numbers and the process ends. If, however, the suggested completed screen to the user is not accepted, then at box 211, additional field entries are input by the user. Next, control of the method returns to box 201 which awaits the user's command to again initiate a screen complete. This process continues until either a screen complete is accepted or all of the fields have been completed.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of automatically completing an electronic form on a data input screen having a plurality of fields, wherein a subset of said plurality of field contain an alphanumeric string previously input by a user, said method comprising the steps of:

a) formulating a history of previously entered screens, said history including a plurality of previously entered screens;

b) analyzing each of the subset of said plurality of fields of said data input screen, wherein said subset of said plurality of fields includes two or more fields of said plurality of fields;

c) generating a sequence of identification numbers by assigning a predetermined identification number to each said subset alphanumeric string of each of the subset of the plurality of fields of said data input screen according to said analysis of each of the subset of the plurality of fields, said predetermined identification number being unique to each said alphanumeric string;

d) comparing the contents of each of said subset of said plurality of fields of said data input screen with the previously entered contents of said subset of said plurality of fields in said plurality of previously entered screens according to said generated sequence of identification numbers; and e) selecting and visually presenting to said user a selected one of said previously entered screens as the completed electronic form according to said comparison, said selected one of said previously entered screens having the most similarity to said input screen.

2. The method of claim 1 wherein said step of formulating a history comprises the step of:

a) generating a sequence of predetermined identification numbers for each previously entered screen, said sequence of predetermined identification numbers comprising individual predetermined identification numbers assigned to each alphanumeric strings in said subset of plurality of fields in each said previously entered screen.

3. The method of claim 2 wherein the step of selecting said selected one of said previously entered screen includes the steps of:

(a) comparing said sequence of identification numbers for said data input screen to each of said sequence of identification numbers for each of said previously entered screens; and (b) determining which of said sequence of identification numbers for each of said previously entered screens includes the most matches to said sequence of identification numbers for said data input screen.

4. The method of claim 1 further including the step of generating a match level, said match level indicative of the degree of similarity between said data input screen and a previously entered screen.

5. The method of claim 4 wherein said user has the option of selecting a previously entered screen that has a lower match level.

6. An apparatus for automatically completing an electronic form on a data input screen having a plurality of fields, wherein a subset of said plurality of fields contain an alphanumeric string previously input by a user, said apparatus comprising:

a) means for formulating a history of previously entered screens, said history including a plurality of previously entered screens;

b) means for analyzing each of the subset of plurality of fields of said data input screen, wherein said subset of said plurality of fields includes two or more fields of said plurality of fields;

c) means for generating a sequence of identification numbers by assigning a predetermined identification number to each said alphanumeric string of each of the subset of the plurality of fields of said data input screen according to said analysis of each of the subset of the plurality of fields, said predetermined identification number being unique to each said alphanumeric string;

d) means for comparing the contents of each of said subset of plurality of fields of said data input screen with the previously entered contents of said subset of plurality of fields in said plurality of previously entered screens according to said generated sequence of identification numbers; and e) means for selecting and visually presenting to said user a selected one of said previously entered screens as the completed electronic form according to said comparison, said selected one of said previously entered screens having the most similarity to said data input screen.

7. The apparatus of claim 6, wherein said means for formulating a history further comprises:

means for generating a sequence of predetermined identification numbers for each previously entered screen, said sequence of predetermined identification numbers comprising individual predetermined identification numbers assigned to each alphanumeric string in said subset of plurality of fields in each said previously entered screen.

8. The apparatus of claim 7 wherein said means for selecting said selected one of said previously entered screen further includes:

(a) means for comparing said sequence of identification numbers for said data input screen to each of said sequence of identification numbers for each of said previously entered screens; and (b) means for determining which of said sequence of identification numbers for each of said previously entered screens includes the most matches to said sequence of identification numbers for said data input screen.

9. The apparatus of claim 6 further including means for generating a match level, said match level indicative of the degree of similarity between said data input screen and a previously entered screen.

10. A method of automatically completing an electronic form on a data input screen having a plurality of fields, wherein a subset of said plurality of field contain an alphanumeric string previously input by a user, said method comprising the steps of:

a) generating a sequence of predetermined identification numbers for each previously entered screen, said sequence of predetermined identification numbers comprising individual predetermined identification numbers assigned to each alphanumeric strings in said subset of plurality of fields in each said previously entered screen.

b) analyzing each of the subset of said plurality of fields of said data input screen, wherein said subset of said plurality of fields includes two or more fields of said plurality of fields;

c) generating a sequence of identification numbers by assigning a predetermined identification number to each said alphanumeric string of each of the subset of the plurality of fields of said data input screen according to said analysis of each of the subset of the plurality of fields, said predetermined identification number being unique to each said alphanumeric string;

d) comparing the contents of each of said subset of said plurality of fields of said data input screen with the previously entered contents of said subset of said plurality of fields in said plurality of previously entered screens according to said generated sequence of identification numbers; and e) selecting and visually presenting to said user a selected one of said previously entered screens as the completed electronic form according to said comparison, said selected one of said previously entered screens having the most similarity to said input screen.

11. An apparatus for automatically completing an electronic form on a data input screen having a plurality of fields, wherein a subset of said plurality of fields contain an alphanumeric string previously input by a user, said apparatus comprising:

a) means for generating a sequence of predetermined identification numbers for each previously entered screen, said sequence of predetermined identification numbers comprising individual predetermined identification numbers assigned to each alphanumeric string in said subset of plurality of fields in each said previously entered screen;

b) means for analyzing each of the subset of plurality of fields of said data input screen, wherein said subset of said plurality of fields includes two or more fields of said plurality of fields;

c) means for generating a sequence of identification numbers by assigning a predetermined identification number to each said alphanumeric string of each of the subset of the plurality of fields of said data input screen according to said analysis of each of the subset of the plurality of fields, said predetermined identification number being unique to each said alphanumeric string;

d) means for comparing the contents of each of said subset of plurality of fields of said data input screen with the previously entered contents of said subset of plurality of fields in said plurality of previously entered screens according to said generated sequence of identification numbers; and e) means for selecting and visually presenting to said user a selected one of said previously entered screens as the completed electronic form according to said comparison, said selected one of said previously entered screens having the most similarity to said data input screen.

\* \* \* \* \*